US008746808B2

(12) United States Patent
Kuan et al.

(10) Patent No.: US 8,746,808 B2
(45) Date of Patent: Jun. 10, 2014

(54) BICYCLE RIM

(75) Inventors: Kim Hong Kuan, Johor Darul Takzim (MY); Yoke Seng Chan, Negeri Sembilan (MY); Masahiro Hanatani, Osaka (JP)

(73) Assignee: Shimano Components (Malaysia) SDN. BHD., Johor (MY)

( * ) Notice: Subject to any disclaimer, the term of this patent is extended or adjusted under 35 U.S.C. 154(b) by 422 days.

(21) Appl. No.: 13/026,492

(22) Filed: Feb. 14, 2011

(65) Prior Publication Data
US 2012/0205965 A1    Aug. 16, 2012

(51) Int. Cl.
B60B 21/06    (2006.01)

(52) U.S. Cl.
USPC ........................................ 301/58; 29/894.333

(58) Field of Classification Search
USPC .................... 301/55, 58, 61, 104; 29/894.333
See application file for complete search history.

(56) References Cited

U.S. PATENT DOCUMENTS

| | | | | |
|---|---|---|---|---|
| 5,104,199 | A * | 4/1992 | Schlanger | 301/64.704 |
| 6,126,243 | A * | 10/2000 | Okajima et al. | 301/58 |
| 6,139,040 | A * | 10/2000 | Dempsey | 280/288.3 |
| 6,213,562 | B1 * | 4/2001 | Muraoka et al. | 301/61 |
| 6,378,953 | B2 * | 4/2002 | Mercat et al. | 301/95.106 |
| 6,497,042 | B1 * | 12/2002 | Dietrich | 29/894.333 |
| 6,536,849 | B1 | 3/2003 | Okajima et al. | |
| 6,715,844 | B2 * | 4/2004 | Dietrich | 301/58 |
| 6,938,962 | B1 * | 9/2005 | Schlanger | 301/58 |
| 7,029,074 | B2 | 4/2006 | Chen | |
| 7,178,239 | B2 | 2/2007 | Meggiolan et al. | |
| 7,192,098 | B2 | 3/2007 | Okajima | |
| 7,290,839 | B2 | 11/2007 | Okajima | |
| 2003/0090143 | A1 * | 5/2003 | Bruce | 301/108.4 |
| 2009/0115240 | A1 * | 5/2009 | Slate et al. | 301/95.104 |
| 2011/0266332 | A1 * | 11/2011 | Lo | 228/162 |

FOREIGN PATENT DOCUMENTS

| | | |
|---|---|---|
| DE | 20 2004 007 803 U1 | 7/2004 |
| DE | 10 2008 048 453 A1 | 10/2009 |
| EP | 1 386 756 A2 | 2/2004 |
| WO | WO 2005/072989 A1 | 8/2005 |

OTHER PUBLICATIONS

European Search Report of corresponding EP Application No. 11 19 3633.2 dated Apr. 2, 2012.

* cited by examiner

*Primary Examiner* — Kip T Kotter
*Assistant Examiner* — Jean Charleston
(74) *Attorney, Agent, or Firm* — Global IP Counselors

(57) ABSTRACT

A bicycle rim is provided with an annular tire mounting part, an annular spoke mounting part, at least one spoke attachment member and an orientation maintaining structure. The annular spoke mounting part includes a plurality of spoke openings a circumferential spaced along the annular spoke mounting part. The spoke mounting part extends from the annular tire mounting part to define an interior space containing the spoke attachment member. The orientation maintaining structure is dimensioned with respect to the interior space to form an orientation maintaining arrangement such that the spoke attachment member is slidably disposed within the interior space in a circumferential direction of the bicycle rim to selectively align with one of the spoke openings while also maintaining an orientation of the spoke attachment member within the interior space to align with the one of the spoke openings.

14 Claims, 13 Drawing Sheets

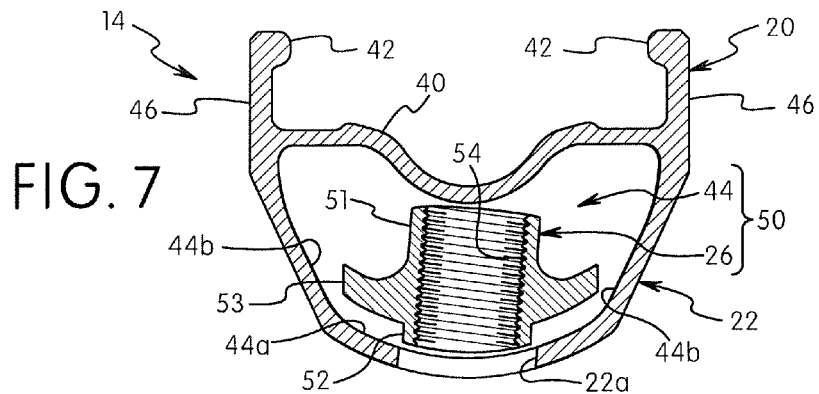
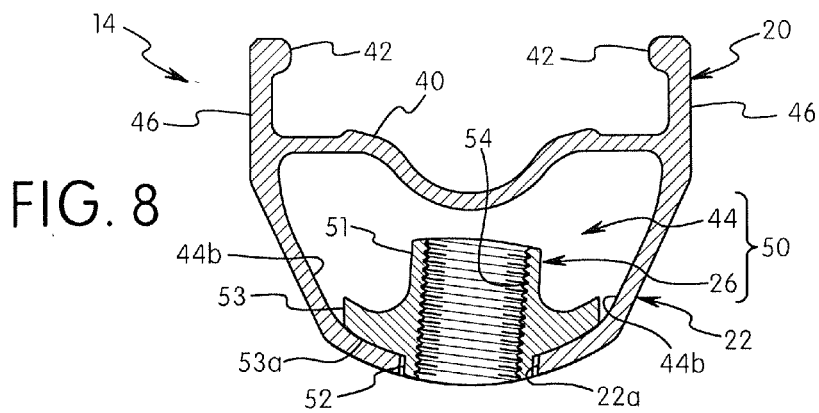
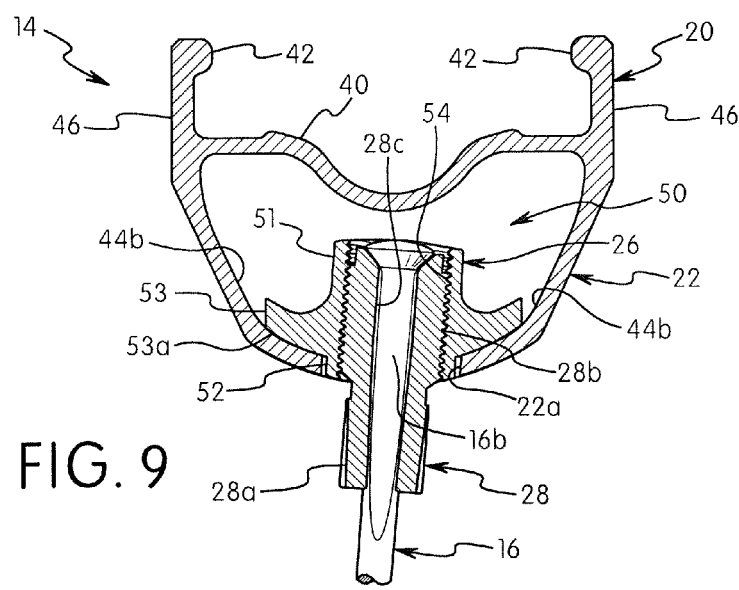

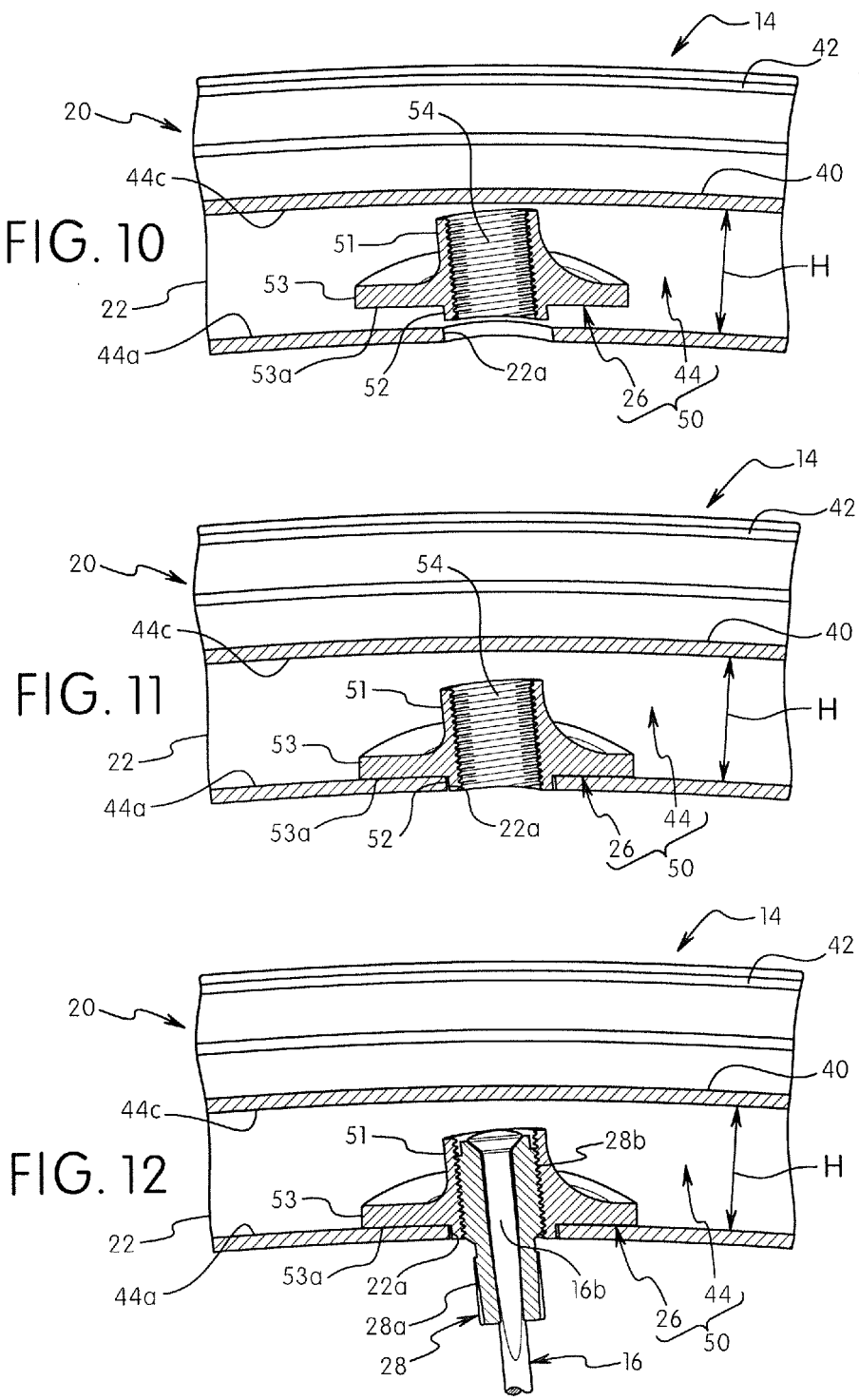

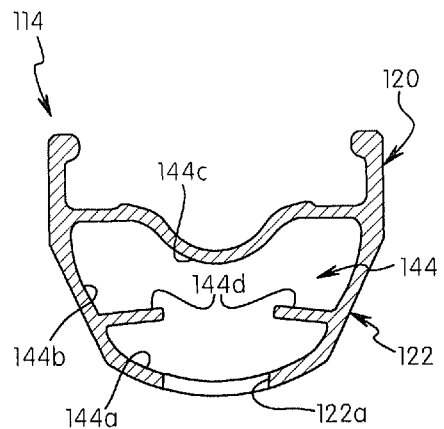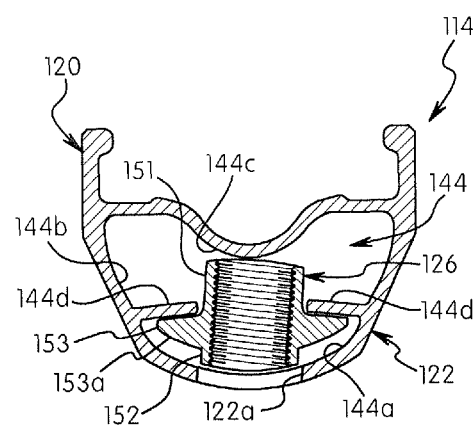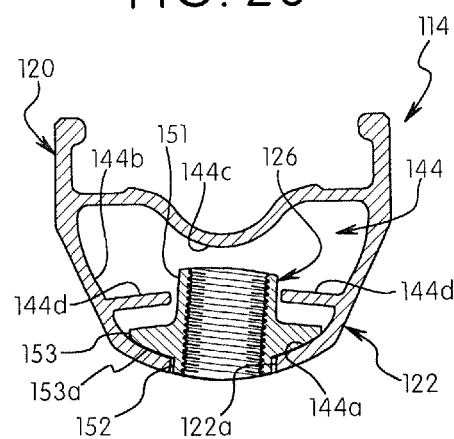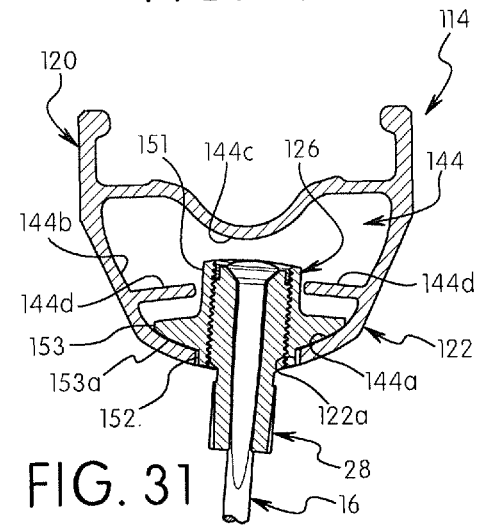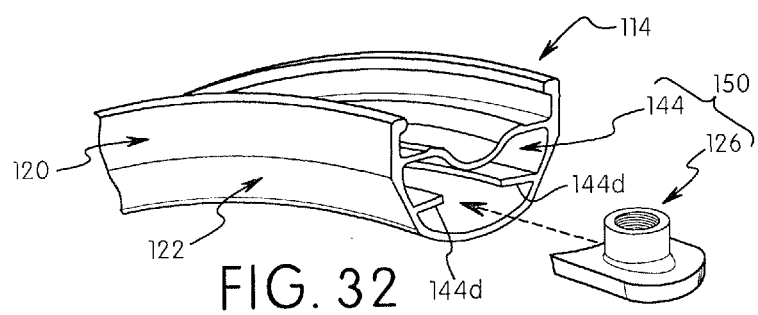

BICYCLE RIM

BACKGROUND

1. Field of the Invention

This invention generally relates to a bicycle rim. More specifically, the present invention relates to a bicycle rim for tensioned spokes.

2. Background Information

Bicycle wheels are continually undergoing design modifications to make them easier to manufacture and assemble, as well as stronger, lighter and more aerodynamic. Various types of bicycle wheels are being sold on the market at present. Many bicycle wheels include a hub, a plurality of spokes and an annular rim. The hub is rotatably mounted to a part of the bicycle frame. The inner end of each spoke is connected to the hub and the spokes extend outward from the hub. The annular rim is connected to the outer ends of the spokes and includes an outer circumferential part that supports a pneumatic tire.

In general, the spokes of a bicycle wheel are thin wire spokes. A flange that connects the spokes to the hub is normally formed at both ends of the hub. Specifically, for example, holes are formed in the hub flanges for receiving the inner ends of the spokes. The interior end of each spoke is supported in a hole formed in one hub flange. In general, the outer end of each spoke is threaded such that the outer end can engage with a spoke nipple that secures the outer end of the wire spoke to the rim hole. In order to make the bicycle wheel as lightweight as possible, the rim is usually made of aluminum alloy, and is sought to be made as thin as possible. However, making the rim thin results in a reduction in strength, particularly in the relatively high-stress areas around each spoke hole. Thus, aluminum rims are often reinforced with either single eyelets or double eyelets to distribute the stress of the spoke. A single eyelet reinforces the spoke hole much like a hollow rivet. A double eyelet is a cup that is riveted into both walls of a double-walled rim.

SUMMARY

One aspect is to provide a bicycle rim cost that is relatively inexpensive and simple to manufacture.

In view of the state of the known technology, a bicycle rim is provided that basically comprises an annular tire mounting part, an annular spoke mounting part, at least one spoke attachment member and an orientation maintaining structure. The annular spoke mounting part includes a plurality of spoke openings disposed at predetermined locations along a circumferential direction of the annular spoke mounting part. The spoke mounting part extends from the annular tire mounting part to define an interior space with a predetermined interior shape. The spoke attachment member is disposed in the interior space. The orientation maintaining structure has a predetermined configuration that is dimensioned with respect to the predetermined interior shape of the interior space to form an orientation maintaining arrangement of such that the spoke attachment member is slidably disposed within the interior space in a circumferential direction of the bicycle rim to selectively align with one of the spoke openings while also maintaining an orientation of the spoke attachment member within the interior space to align with the one of the spoke openings.

These and other objects, features, aspects and advantages of the bicycle rim present disclosure will become apparent to those skilled in the art from the following detailed description, which, taken in conjunction with the annexed drawings, discloses two illustrated embodiments.

BRIEF DESCRIPTION OF THE DRAWINGS

Referring now to the attached drawings which form a part of this original disclosure:

FIG. 7 is an enlarged cross-sectional view of the portion of the bicycle rim illustrated in FIG. 3, but with one of the spoke attachment members slidably disposed in the interior space of the rim;

FIG. 8 is an enlarged cross-sectional view of the portion of the bicycle rim illustrated in FIGS. 3 and 7, but with the spoke attachment member disposed in one of the spoke openings;

FIG. 9 is an enlarged cross-sectional view of the portion of the bicycle rim illustrated in FIGS. 3, 7 and 8, but with the spoke attachment member disposed in the spoke openings and one of the spokes attached to the spoke attachment member by a spoke nipple;

FIG. 10 is an enlarged, circumferential cross-sectional view of a portion of the bicycle rim illustrated in FIGS. 1 to 3, showing one of the spoke attachment members slidably disposed in the interior space;

FIG. 11 is an enlarged, circumferential cross-sectional view of the portion of the bicycle rim illustrated in FIG. 10, but with the spoke attachment member disposed in one of the spoke openings;

FIG. 12 is an enlarged, circumferential cross-sectional view of the portion of the bicycle rim illustrated in FIGS. 10 and 11, but with the spoke attachment member disposed in the spoke opening and one of the spokes attached to the spoke attachment member by a spoke nipple or plug;

FIG. 28 is an enlarged cross-sectional view of a portion of a bicycle rim in accordance with another embodiment;

FIG. 29 is an enlarged cross-sectional view of a portion of the bicycle rim illustrated in FIG. 28, but with the spoke attachment member slidably disposed in the interior space of the rim;

FIG. 30 is an enlarged cross-sectional view of the portion of the bicycle rim illustrated in FIGS. 28 and 29, but with the spoke attachment member disposed in one of the spoke openings;

FIG. 31 is an enlarged cross-sectional view of the portion of the bicycle rim illustrated in FIGS. 28, 29 and 30, but with the spoke attachment member disposed in the spoke opening and one of the spokes attached to the spoke attachment member by a spoke nipple or plug; and FIG. 32 is a perspective view of portion of the tubular rim member of the bicycle rim illustrated in FIGS. 28, 29 and 30 with one of the spoke attachment members being inserted inside the interior space of the tubular rim member through one of the first and second ends.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
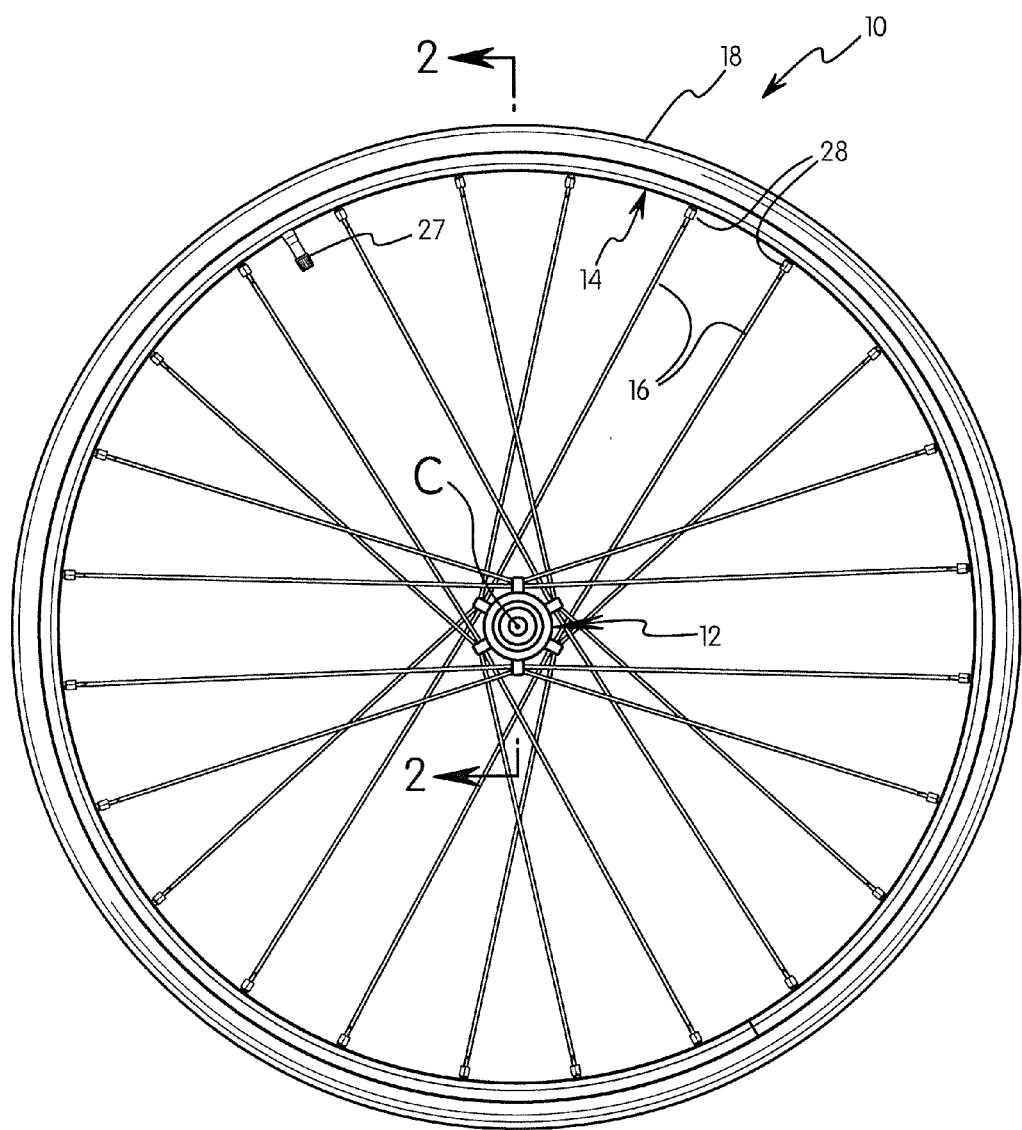
FIG. 1 is a side elevational view of a bicycle wheel that includes a bicycle rim in accordance with a first illustrated embodiment.
Figure 2:
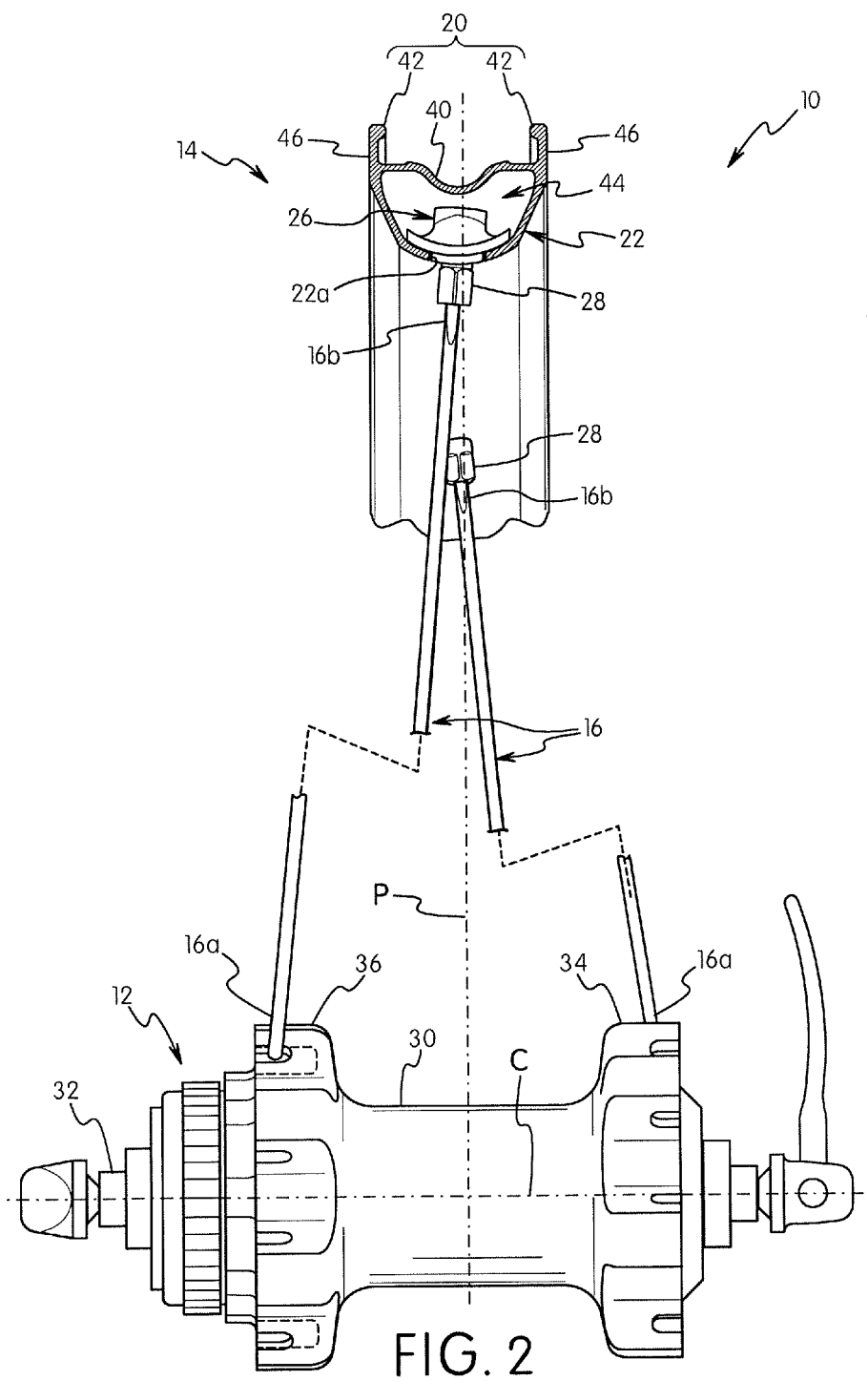
FIG. 2 is an enlarged cross sectional view of a portion of the front wheel illustrated in FIG. 1 as seen along section line 2-2 in FIG. 1.

Referring initially to FIGS. 1 and 2, a tensioned spoke bicycle wheel 10 is illustrated in accordance with a first illustrated embodiment. The bicycle wheel 10 basically includes a center hub 12, a bicycle rim 14, a plurality of spokes 16 and a pneumatic tire 18. The hub 12 connected to the rim 14 by the spokes 16, which are placed under tension. The tire 18 is attached to the outer periphery of the rim 14. The hub 12, the spokes 16 and the tire 18 are conventional parts, and thus, the hub 12, the spokes 16 and the tire 18 will only be briefly explained herein. The bicycle wheel 10 is a clincher tire wheel in which that an air tight chamber is formed between the outer surface of the rim 14 and a pneumatic tire 18. Of course, it will be apparent to those skilled in the art from this disclosure that the rim 14 can be adapted to a tubeless tire wheel as needed and/or desired.

Figure 3:
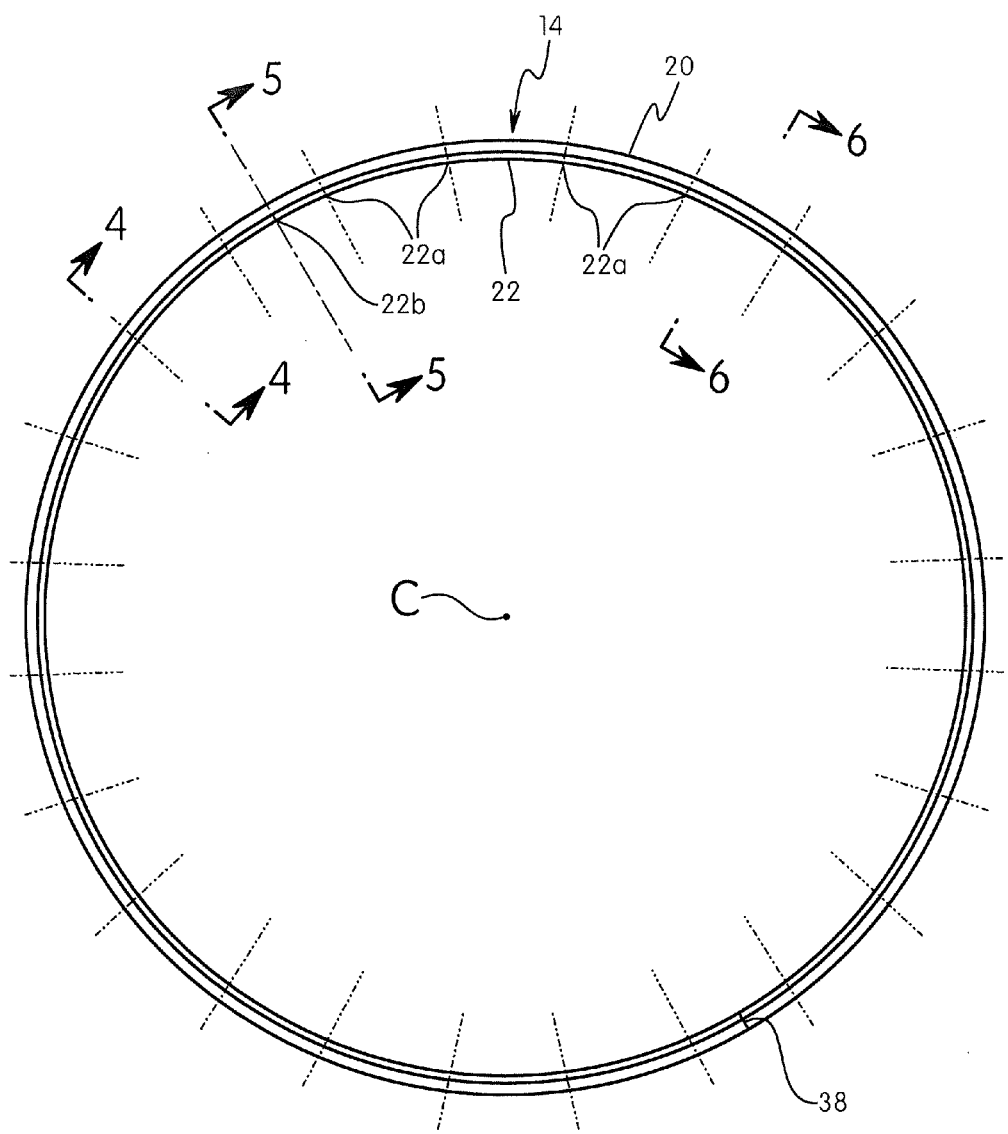
FIG. 3 is a side elevational view of the bicycle rim of the wheel illustrated in FIG. 1, with the tire and spokes removed for the purpose of illustration.
Figure 4:
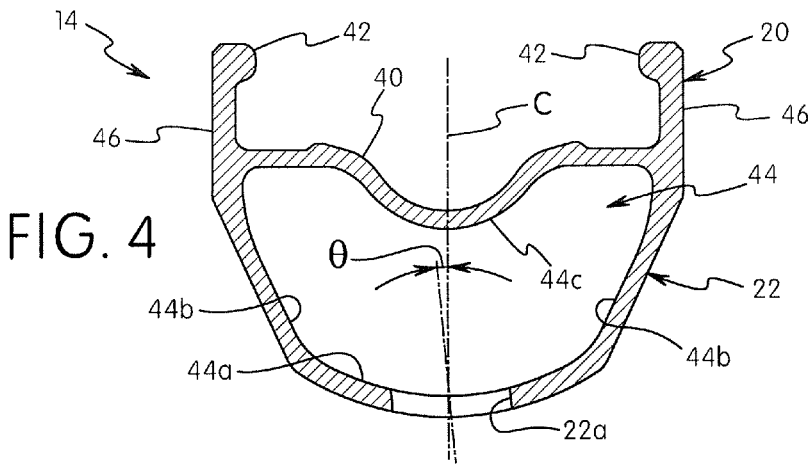
FIG. 4 is an enlarged cross-sectional view of a portion of the bicycle rim illustrated in FIGS. 1 to 3, as seen along section line 4-4 in FIG. 3.
Figure 5:
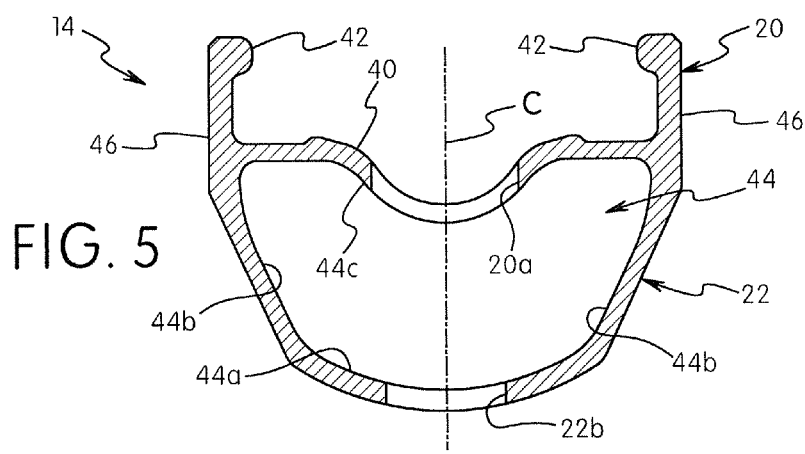
FIG. 5 is an enlarged cross-sectional view of a portion of the bicycle rim illustrated in FIGS. 1 to 3, as seen along section line 5-5 in FIG. 3.
Figure 6:
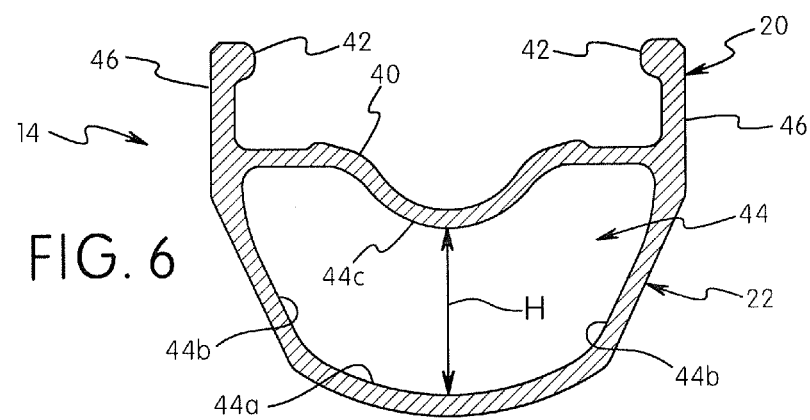
FIG. 6 is an enlarged cross-sectional view of a portion of the bicycle rim illustrated in FIGS. 1 to 3, as seen along section line 6-6 in FIG. 3.
Figure 13:
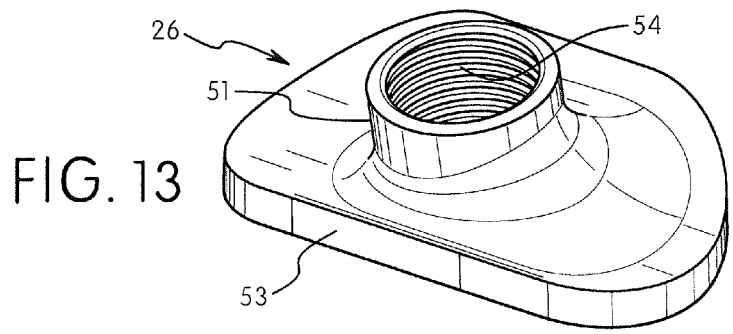
FIG. 13 is a perspective view of one of the spoke attachment members of the bicycle rim illustrated in FIGS. 1 to 3.
Figure 14:
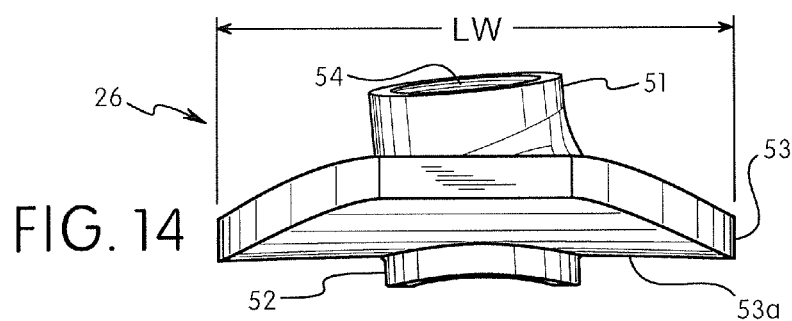
FIG. 14 is a side elevational view of the spoke attachment member illustrated in FIG. 13.
Figure 15:
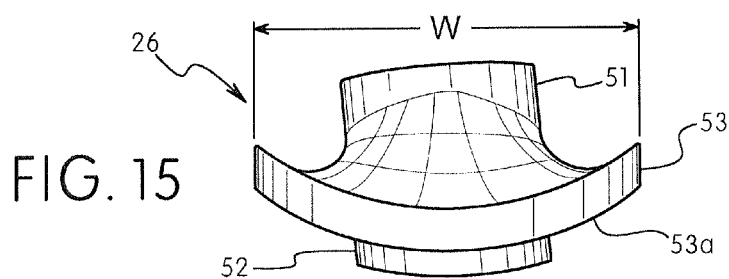
FIG. 15 is an end elevational view of the spoke attachment member illustrated in FIGS. 13 and 14.
Figure 16:
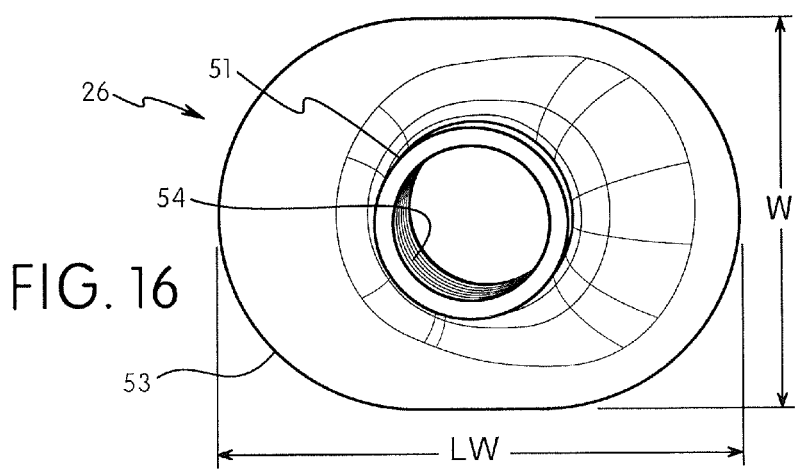
FIG. 16 is an outer radially facing side view of the spoke attachment member illustrated in FIGS. 13, 14 and 15.

As seen in FIGS. 2 and 3, the rim 14 basically includes an annular tire mounting part 20, an annular spoke mounting part 22 and a plurality of spoke attachment members 26. In the illustrated embodiment, the annular tire mounting part 20 and the annular spoke mounting part 22 are formed as a one-piece, unitary member from as suitable metal such as an aluminum alloy. The annular tire mounting part 20 as a single air valve mounting opening 20a for attaching an air valve 27. The annular spoke mounting part 22 has a plurality of spoke openings 22a that corresponds to the number of the spokes 16. The annular spoke mounting part 22 also has a single air valve through opening 22b for receiving the air valve 27 therethrough.

The spoke attachment members 26 are individual, separate members that are aligned with the spoke openings 22a. The spoke attachment members 26 are formed of a hard rigid material such as a metallic material such as aluminum or other suitable metal. Of course, it will be apparent to those skilled in the art from this disclosure that the spoke attachment members 26 can be formed of a fiber reinforced plastic (FRP) or a resin with carbon fibers as needed and/or desired. The spoke attachment members 26 are firmly held against an interior surface of the annular spoke mounting part 22 by the tension of the spokes 16. As explained in more detail below, the spokes 16 are each adjustably to one of the spoke attachment members 26 by a spoke nipple or plug 28 that is threaded into one of the spoke attachment members 26.

The spokes 16 will now be explained with reference to FIGS. 1 and 2. The spokes 16 are all preferably identical to each other. The spokes 16 are preferably integrally formed as a one-piece, unitary single member (integral member) using conventional manufacturing techniques. In the embodiment illustrated, the spokes 16 are radial spokes that connect the hub 12 to the rim 14. The spokes 16 are aligned along a circumferential direction at equal intervals along the rim 14. Each spoke 16 basically includes an inner end 16a and an outer end 16b. Each of the outer ends 16b of the spokes 16 has a flange or enlarged part for engaging one of the spoke plug 28. In the embodiment illustrated, a total of twenty-four radial spokes 16 are used. Naturally, it will be apparent to those skilled in the bicycle field from this disclosure that the bicycle wheel 10 can have fewer or more spokes and/or a different spoking arrangement (for example, such as that in which all spokes are radial spokes, or in which some spokes are tangential spokes and some are radial spokes).

Still referring to FIGS. 1 and 2, the hub 12 will now be briefly explained. The hub 12 is a relatively conventional hub, which basically includes a cylindrical hub shell 30 rotatably supported on a hub axle 32 by a pair of bearings (not shown). The hub axle 32 defines a center axis C of the bicycle wheel 10 and the rim 14. As seen in FIG. 2, the hub 12 has two spoke attachment portions 34 and 36 for attaching the spokes 16. In particular, each of the attachment portions 34 and 36 has six spoke mounting lugs with each lug having two spoke mounting openings for attaching the spokes 16. In the embodiment illustrated, the attachment portions 34 and 36 are mirror images of each other, but with the spoke mounting lugs being circumferentially offset. In other words, the spoke mounting points of the attachment portion 34 are offset in the circumferential direction from the spoke mounting points of the attachment portion 36. In the embodiment illustrated, the hub 12 is a front bicycle hub. However, it will be apparent to those skilled in the bicycle field from this disclosure that the hub 12 can be replaced with a rear hub, as needed and/or desired.

Referring now to FIGS. 2 to 9, the bicycle rim 14 will now be explained in more detail. The rim 14 is essentially a circular metal member that is attached to the outer ends 16b of the spokes 16 by the spoke plugs 28 in a conventional manner. The tire 18 is attached to the outer periphery of the rim 14 in a conventional manner. In this first illustrated embodiment, the rim 14 is a metal rim formed of a suitable metallic material such as an aluminum alloy. Of course, it will be apparent to those skilled in the art from this disclosure that the rim 14 can be formed of a fiber reinforced plastic (FRP) or a resin with carbon fibers as needed and/or desired. For example, the rim 14 can be formed by extruding metal into a metal tube with a desired uniform cross sectional profile suitable for the rim 14. The metal tube or hoop is then cut to the desired length and bent into a hoop member. The spoke attachment members 26 are inserted into the metal tube. Finally, the first and second ends of the hoop member are joined together to define a rim joint part 38. The cross sectional profile of the rim 14 can have a wide range of geometry, which can be optimized for particular performance goals as needed and/or desired. Aerodynamics, mass and inertia, stiffness, durability, tubeless tire compatibility, brake compatibility, and cost are all considerations in the cross sectional profile of the rim 14.

As seen in FIGS. 4 to 9, in this illustrated embodiment, the annular tire mounting part 20 and the annular spoke mounting part 22 are integrally formed as a one-piece, unitary hoop member with a uniform cross sectional profile, except for where has been removed material (e.g., at the air valve mounting opening 20a, the spoke openings 22a and the air valve through opening 22b. The annular tire mounting part 20 of the bicycle rim 14 includes an annular outer bridge 40 and a pair of bead hooks or bead flanges 42. The annular outer bridge 40 is free of any openings communicating with the interior space except for the single air valve mounting opening 20a, which is used to mount the air valve 27 in a conventional manner. The annular spoke mounting part 22 extends from the annular tire mounting part 20 to define an interior space 44 with a predetermined interior shape.

As best seen in FIG. 3, the spoke openings 22a are disposed at predetermined locations along a circumferential direction of the annular spoke mounting part 22. While the annular spoke mounting part 22 of the rim 14 is provided with twenty-four of the spoke openings 22a, the annular spoke mounting part 22 can have fewer or more of the spoke openings 22a as needed and/or desired. The spoke openings 22a in the annular spoke mounting part 22 are angled so that their center axes form acute angles with respect to a center plane P of the rim 14, which extends perpendicularly from the center axis C of the bicycle wheel 10 and bisects the rim 14 into two halves. In particular, the spoke openings 22a are angled with respect to the center plane P by about five to six degrees in an alternating manner. In particular, the angles of the spoke openings 22a are arranged so that the center axes of the spoke openings 22a alternate in opposite directions relative to the center plane P of the rim 14. In other words, every other one of the spoke openings 22a have their center axes tilted to a first side of the center plane P, and the other the spoke openings 22a have their center axes tilted to a second side of the center plane P.

As mentioned above, the annular tire mounting part 20 and the annular spoke mounting part 22 is free of any openings communicating with the interior space 44 except for the air valve mounting opening 20a, the air valve through opening 22b and the spoke openings 22a. While the air valve mounting opening 20a, the air valve through opening 22b and the spoke openings 22a are all circular openings, theses openings can have other shapes as needed and/or desired.

The bead flanges 42 and the sides of the annular spoke mounting part 22 are surface treated to form a pair of flat brake contact surfaces 46. The brake contact surfaces 46 are disposed both inward and outward of the outer bridge 40 (i.e., extending across the outer bridge 40) in a radial direction with respect to the center axis C of the rim 14. The brake contact surfaces 46 are continuous flat surfaces. The brake contact surfaces 46 are typically formed by grinding the sides of the rim 14 after butt welding the ends of the rim 14 together to form a hoop. The grinding of the sides of the rim 14 to form the brake contact surfaces 46 are beneficial in that any roughness produced due to the butt welding procedure can be removed from the brake contact surfaces 46.

In this first illustrated embodiment, the predetermined interior shape of the interior space 44 is defined by the interior surfaces of the annular tire mounting part 20 and the annular spoke mounting part 22. In particular, the interior space 44 is defined an annular curved interior surface 44a of the annular spoke mounting part 22, a pair of annular planar side interior surfaces 44b of the annular spoke mounting part 22, and an annular undulated interior surface 44d of the annular outer bridge 40. The interior space 44 has a minimum radial height H along the center plane P of the rim 14. The minimum radial height H of the interior space 44 is dimensioned with respect to the radial height of the spoke attachment members 26 so that the spoke attachment members 26 cannot tip over. Preferably, the minimum radial height H of the interior space 44 is dimensioned with respect to the radial height of the spoke attachment members 26 so that the spoke attachment members 26 can only slightly tilt relative to the center plane P of the rim 14. Moreover, each of the spoke attachment members 26 has a maximum lateral dimension or width W with respect to a lateral dimension or width of the interior space 44 so that lateral movement of the spoke attachment members 26 is limited within the interior space 44.

Referring to FIGS. 7 to 12, the spoke attachment members 26 (only one shown) are slidably disposed within the interior space 44 to move in a circumferential direction of the rim 14. However, as discussed below, the spoke attachment members 26 are maintained in an upright position so that they will easy fall into a corresponding one of the spoke openings 22a. Generally speaking, the overall shapes of the spoke attachment members 26 together with the interior configuration of the interior space 44 constitute an orientation maintaining arrangement 50. In other words, the orientation maintaining arrangement 50 is a mating configuration between the spoke attachment members 26 and the interior configuration of the interior space 44 that prevents the spoke attachment members 26 from tipping over within the interior space 44. The spoke attachment members 26 are dimensioned such that the spoke attachment members 26 are larger than the spoke openings 22a and the single air valve opening 22b. Thus, the spoke attachment members 26 cannot pass through the spoke openings 22a and the single air valve opening 22b. If in addition to the air valve mounting opening 20a, the outer bridge 40 were formed with any additional openings or bores (e.g. for weight saving) that are not shown, then the additional openings or bores are sized such the spoke attachment members 26 cannot pass through the additional openings or bores. In other words, in the illustrated embodiment, the spoke attachment members 26 are larger than the air valve mounting opening 20a, the spoke openings 22a, the air valve through opening 22b and any other additional openings or bores in the rim 14 so that the spoke attachment members 26 cannot fall out of the rim 14 once the ends of the rim 14 are joined together.

Referring to FIGS. 13 to 16, one of the spoke attachment members 26 is illustrated by itself. All of the spoke attachment members 26 are preferably identical. However, the shapes of the spoke attachment members 26 can vary among the spoke attachment members 26 as need and/or desired. In the illustrated embodiment, the spoke attachment member 26 is a one-piece, unitary member formed of a hard rigid material such as a metal material, or a fiber reinforced plastic (FRP), or a resin with carbon fibers. The spoke attachment member 26 constitutes a spoke receiving part that limits radial movement of the spoke attachment member 26 within the interior space 44 with respect to the center axis C of the bicycle rim 14. In any event, each of the spoke attachment members 26 includes a first or outer tubular portion 51, a second or inner tubular portion 52 and an orientation maintaining flange 53. The first and second tubular portions 51 and 52 and the orientation maintaining flange 53 are formed as a one-piece member. However, if needed and/or desired, the orientation maintaining flange 53 can be a separate member that is fixed to the first and second tubular portions 51 and 52.

A threaded bore or hole 54 extends through the first and second tubular portions 51 and 52 and the orientation maintaining flange 53 of the spoke attachment member 26. The threaded bore 54 constitutes the spoke receiving part of the spoke attachment member 26. The second tubular portion 52 of the spoke attachment member 26 constitutes a projection that is dimensioned to be received in the one of the spoke openings 22a. The second tubular portions 52 have free end surfaces that are preferably flush with the exterior surface of the annular spoke mounting part 22 as seen in FIGS. 7 to 12. Alternatively, the second tubular portions 52 can protrude from the spoke openings 22a such that the free end surfaces of the second tubular portions 52 stands out from the exterior surface of the annular spoke mounting part 22. Also if needed and/or desired, the second tubular portions 52 can be eliminated such that nothing of the spoke attachment members 26 protrudes from the orientation maintaining flanges 53 into the spoke openings 22a, or the second tubular portions 52 can be shortened such that the free end surfaces of the second tubular portions 52 are recessed within the spoke openings 22a relative to the exterior surface of the annular spoke mounting part 22.

The orientation maintaining flange 53 has a curved rim contact surface 53a that mates with the curvatures of the surface 44c of the annular spoke mounting part 22 while the second tubular portion 52 is disposed in one of the spoke openings 22a. The orientation maintaining flange 53 defines the maximum lateral width W of the spoke attachment member 26. Also the orientation maintaining flange 53 defines a maximum lengthwise width LW of the spoke attachment member 26 in the circumferential direction of the rim 14. While the spoke attachment member 26 is circumferentially aligned with one of the spoke openings 22a, the threaded bore 54 is at least partially visible (more preferably mostly visible) through the spoke opening 22a even while the orientation maintaining flange 53 contacts one of the side interior surfaces 44b. In other words, the lateral width W of the spoke attachment member 26 is preferably sized relative to the relative lateral width of the interior space 44 such that the threaded bore 54 is partially visible through the spoke opening 22a while the orientation maintaining flange 53 engages the side interior surfaces 44b and the spoke attachment member 26 is circumferentially aligned with one of the spoke openings 22a.

Referring back to FIGS. 7 to 12, the threaded bore 54 of the first and second tubular portions 51 and 52 has an internal thread that receives the spoke plug 28 for securing the outer end 16b of the spoke 16 to the rim 14. In particular, the spoke plug 28 has a tool engagement portion 28a and a threaded portion 28b with a spoke receiving bore 28c. The tool engagement portion 28a has a hexagonal exterior surface as viewed along the spoke receiving bore 28c of the spoke plug 28. The threaded portion 28b has an external thread that is engaged with the internal thread of the threaded bore 54 to adjustably secure the spoke plug 28 to the spoke attachment member 26. By turning the spoke plug 28 on the spoke 16, the spoke plug 28 moves axially with respect to the threaded bore 54 of the spoke attachment member 26 to adjust the tension in the spoke 16. The orientation maintaining flange 53 acts as a projection with the curved contact surface 53a acting as a curved rim contact surface. The curved contact surface 53a has a curvature that matches a curvature of the interior surface 44a of the annular spoke mounting part 22 in both the circumferential direction of the rim 14 and the width direction of the rim 14. In this way, the spoke attachment member 26 does not turn in response to the spoke plug 28 being turned during adjusting the spoke tension of the spoke 16.

The orientation maintaining flange 53 constitutes an orientation maintaining structure of the orientation maintaining arrangement 50 that is formed on the spoke attachment member 26. In other words, the orientation maintaining flange 53 (e.g., the orientation maintaining structure) has a predetermined configuration that is dimensioned with respect to the predetermined interior shape of the interior space 44 to form a part of the orientation maintaining arrangement 50 such that the spoke attachment member 26 is slidably disposed within the interior space 44 in a circumferential direction of the bicycle rim 14 to selectively align with one of the spoke openings 22a while also maintaining an orientation of the spoke attachment member 26 within the interior space 44 to align with the one of the spoke openings 22a.

In this first illustrated embodiment, the spoke attachment member 26 and the orientation maintaining flange 53 (e.g., the orientation maintaining structure) are fixedly coupled each other as a unit. Since in this first illustrated embodiment, the spoke attachment member 26 is a one-piece, unitary member formed of a metallic material, the spoke attachment member 26 and the orientation maintaining flange 53 (e.g., the orientation maintaining structure) are also one-piece in this first illustrated embodiment. However, the orientation maintaining flange 53 can be a separate member if needed and/or desired. The orientation maintaining flange 53 of the orientation maintaining structure 50 forms the maximum width W of the spoke attachment member 26 as measured in a direction parallel to the center axis C of the rim 14. The maximum width W of the spoke attachment member 26 is larger than a minimum height of the interior space 44 as measured in the radial direction with respect to the center axis C of the bicycle rim 14. The maximum lengthwise width LW of the spoke attachment member 26 is also larger than the minimum radial height H of the interior space 44 as measured in the radial direction with respect to the center axis C of the bicycle rim 14.

Figure 17:
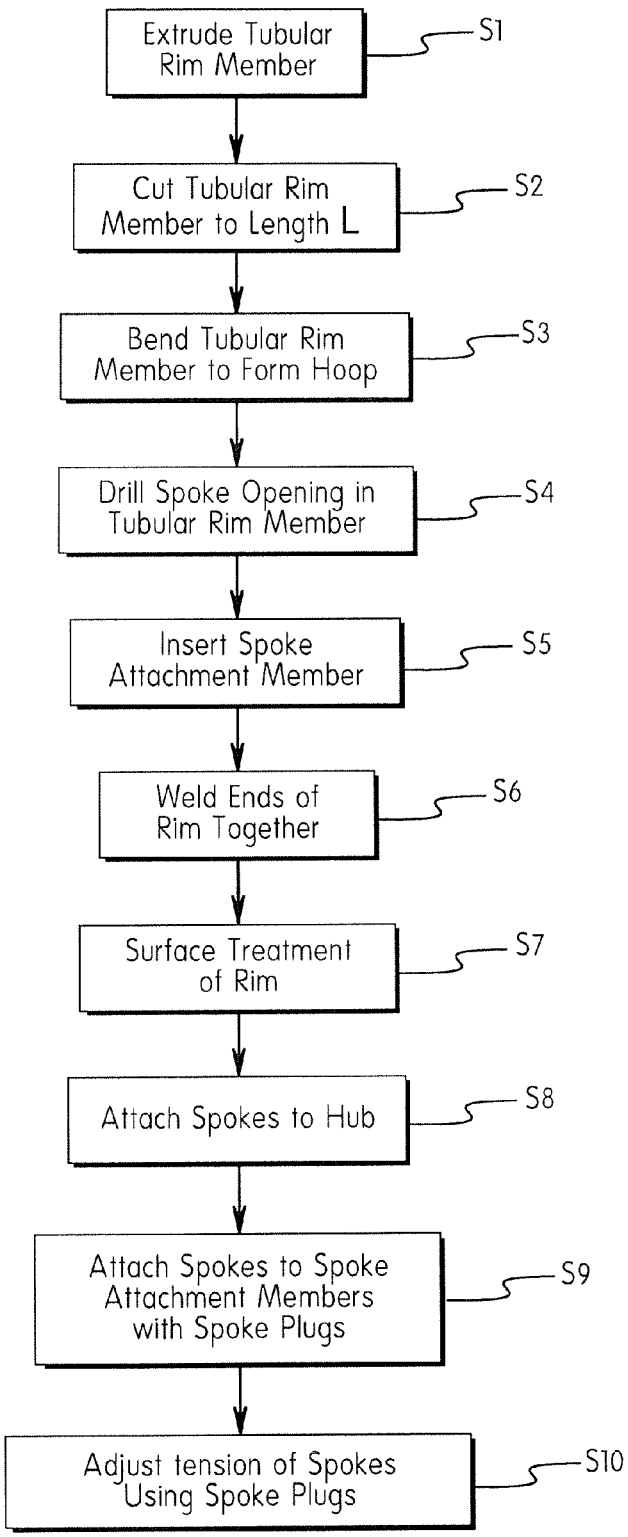
FIG. 17 is a flow diagram illustrating one bicycle rim manufacturing method in which a plurality of the spoke attachment members used in the rim.

Turning now to FIGS. 17 to 27, a method of manufacturing the rim 14 will be discussed. FIG. 17 illustrated a flow chart of a series of steps in manufacturing the rim 14. Unless otherwise stated, the steps of this method of manufacturing the rim 14 can be accomplish in a different order. Moreover, the while the steps are shown as separate steps, it is possible that some of the steps can be combined such that they are preformed simultaneously. As seen in FIG. 17, in step S1, a metal material is extruded into a straight tubular rim member (a metal tube) with a desired uniform cross sectional profile suitable for the rim 14.

Figure 18:
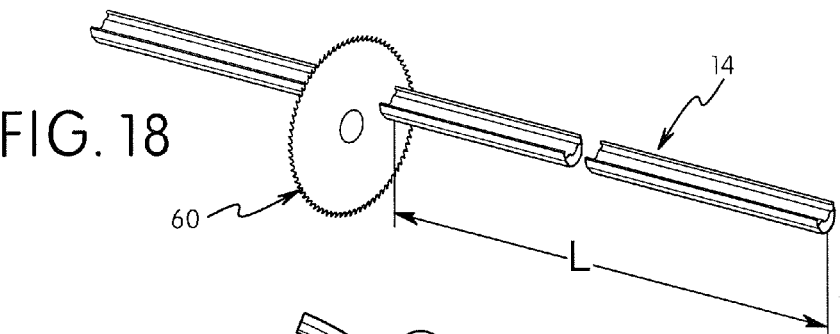
FIG. 18 is a diagrammatic view of a portion of a tubular rim member that is extruded as a straight metal extrusion and that is being cut to a desired predetermined length for manufacturing a bicycle rim of a predetermined diameter.

In step S2, as diagrammatically shown in FIG. 18, the straight tubular rim member is cut with a cutting device 60 to a predetermined length L that is suitable for a desired rim diameter. Thus, in step S2, a rim element is provided that includes a first end, a second end and with a predetermined interior shape that defines the interior space 44 (FIGS. 4 to 9).

Figure 19:
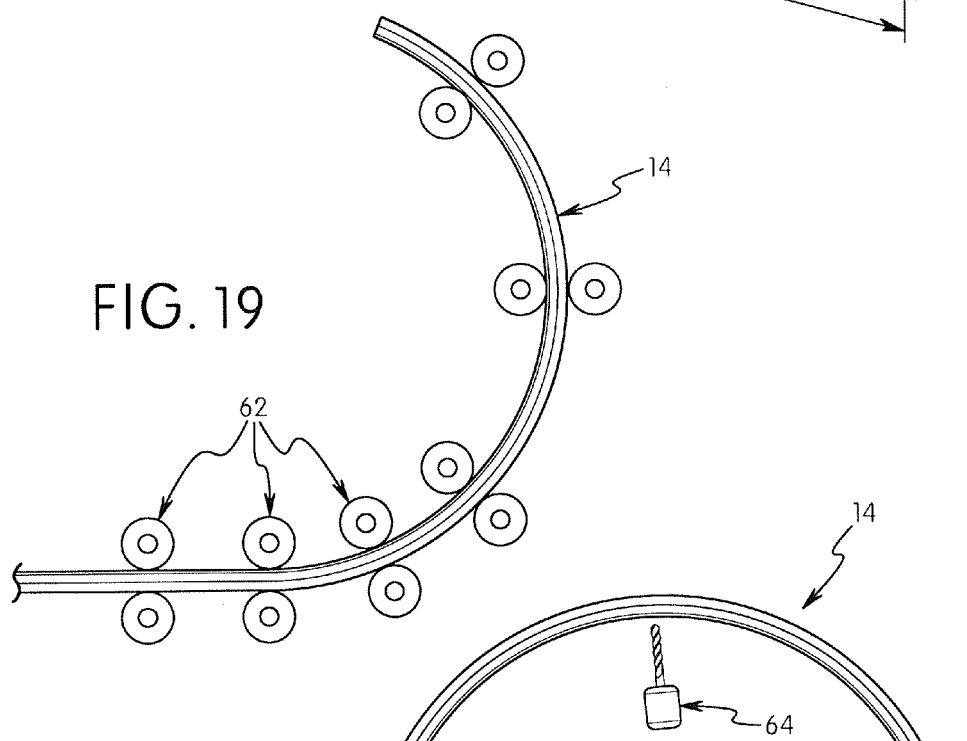
FIG. 19 is a diagrammatic view of the tubular rim member of FIG. 18 being bent to form a hoop.

In step S3, as diagrammatically shown in FIG. 19, the straight tubular rim member is bent into a hoop with the desired curvature using a plurality of rollers 62. Once the rim member is fully bent, the hoop takes the shape shown in FIG. 20, i.e., a split ring.

Figure 20:
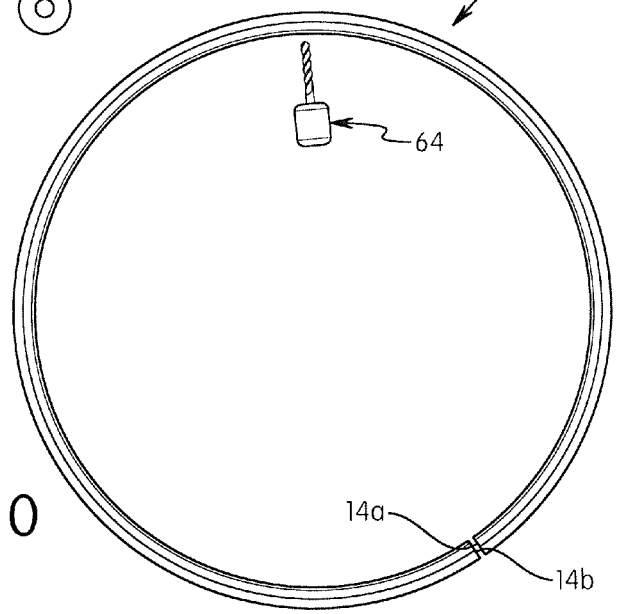
FIG. 20 is a diagrammatic view of the tubular rim member of FIGS. 18 and 19 being drilled to form a plurality of spoke openings in the tubular rim member.

In step S4, as diagrammatically shown in FIG. 20, the spoke openings 22a are formed in the curved tubular rim member (hoop) by a mechanical forming operation in which a mechanical forming tool 64 (e.g., a drill) is used. While a drilling operation is illustrated, the spoke openings 22a can be formed in other ways as needed and/or desired. Moreover, the spoke openings 22a can be formed be formed prior to the bending of the straight tubular rim member into a hoop as needed and/or desired.

Figure 21:
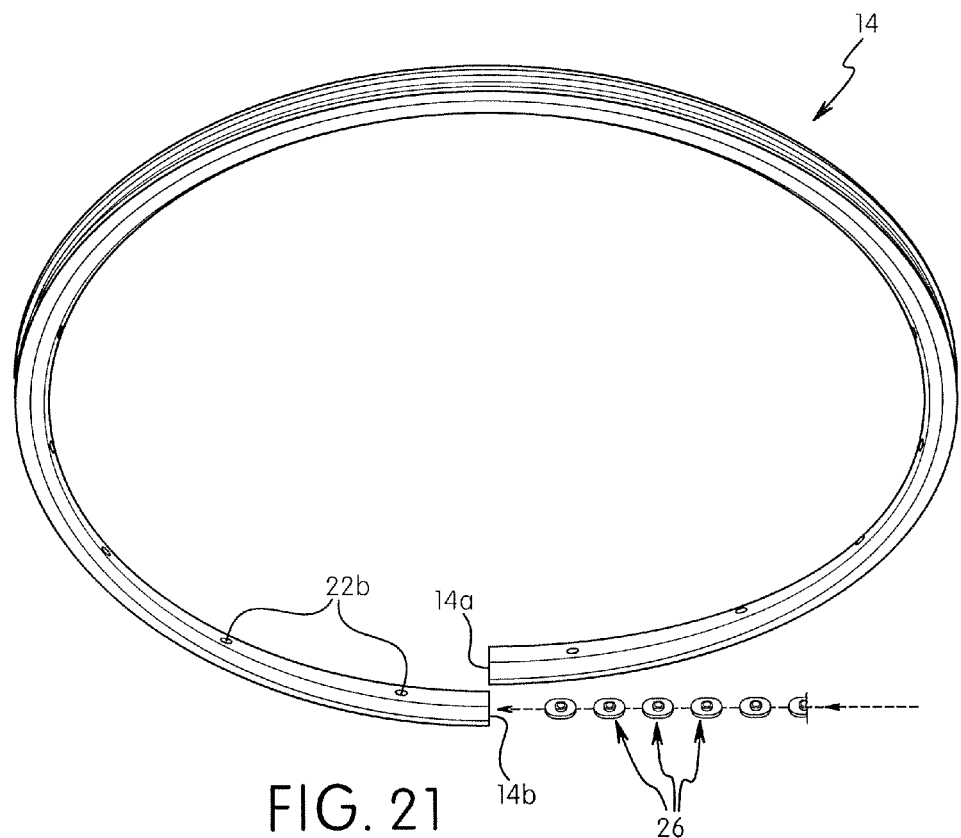
FIG. 21 is a perspective view of a portion of the tubular rim member with the spoke attachment members being inserted inside the interior space of the tubular rim member through one of the first and second ends.
Figure 22:
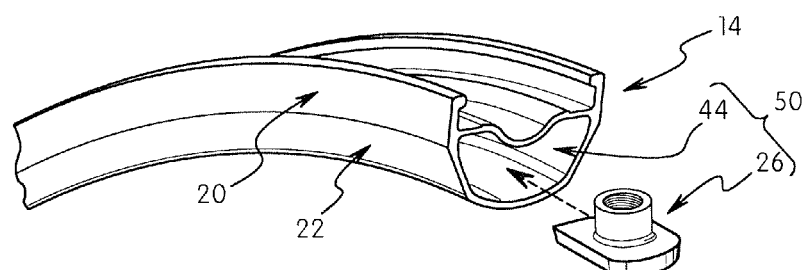
FIG. 22 is a perspective view of the tubular rim member with one of the spoke attachment members being inserted inside the interior space of the tubular rim member through one of the first and second ends.

In step S5, as diagrammatically shown in FIG. 21, the spoke attachment members 26 are inserted into the interior space 44 of the tubular rim member through one of the first and second ends of the tubular rim member. Since each of the spoke attachment members 26 has a predetermined configuration (e.g., the orientation maintaining flange 53) that is dimensioned with respect to the predetermined interior shape of the interior space 44 to form the orientation maintaining arrangement 50, the spoke attachment members 26 are slidably disposed within the interior space 44 in a circumferential direction of the bicycle rim 14 while the orientation of the spoke attachment members 26 are maintained within the interior space 44.

Figure 23:
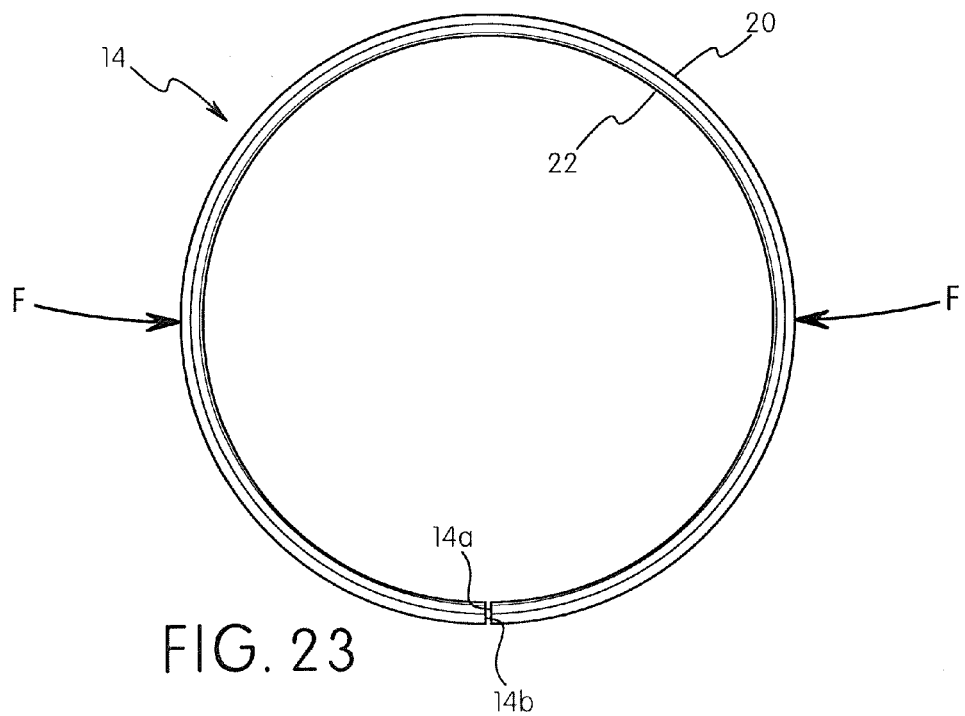
FIG. 23 is a side elevational view of the tubular rim member with the first and second ends of the tubular rim member being pushed together after the inserting of the spoke attachment members inside the interior space of the tubular rim member.
Figure 24:
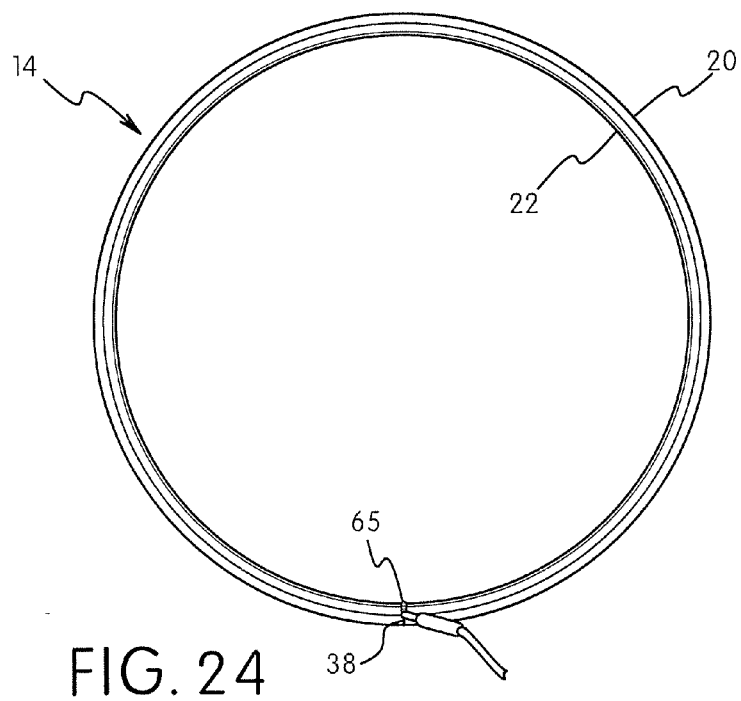
FIG. 24 is an side elevational view of the tubular rim member with the first and second ends of the rim being welded together.
Figure 25:
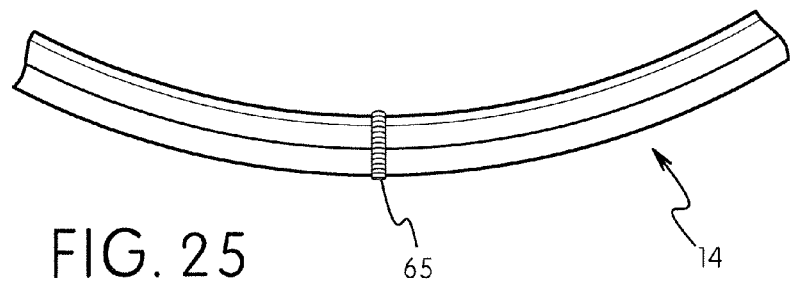
FIG. 25 is an enlarged side elevational view of a portion of the tubular rim member showing the weld between the first and second ends of the rim.

In step S6, as diagrammatically shown in FIGS. 23 to 25, the first and second ends of the tubular rim member are attached (e.g., butt welded) together to form the rim joint part 38. In particular, forces F are applied to the tubular rim member such that the first and second ends of the tubular rim member are aligned and pushed together as seen in FIGS. 23 and 24. Once the first and second ends of the tubular rim member are aligned and pushed together, the first and second ends of the tubular rim member are butt welded together such that a weld 65 is formed. This weld 65 can be formed by adding material to the rim 14 or by merely melting the ends of the rim 14 together. Of course, this step of attaching the ends of the rim 14 together needs to be done after the inserting of the spoke attachment members 26 inside the interior space 44 of the tubular rim member.

Figure 26:
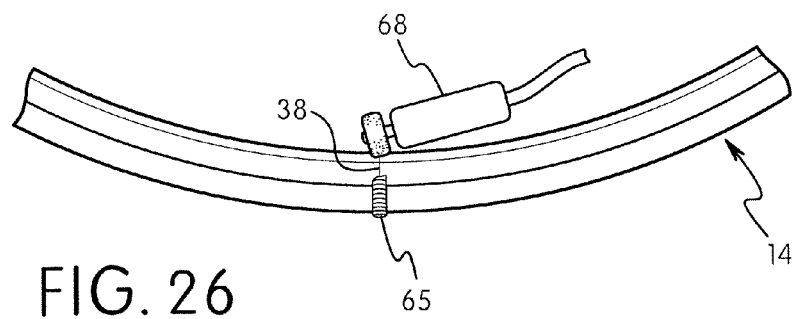
FIG. 26 is an enlarged side elevational view of a portion of the tubular rim member showing surface treating the rim to remove the protruding part of the weld between the first and second ends of the rim.
Figure 27:
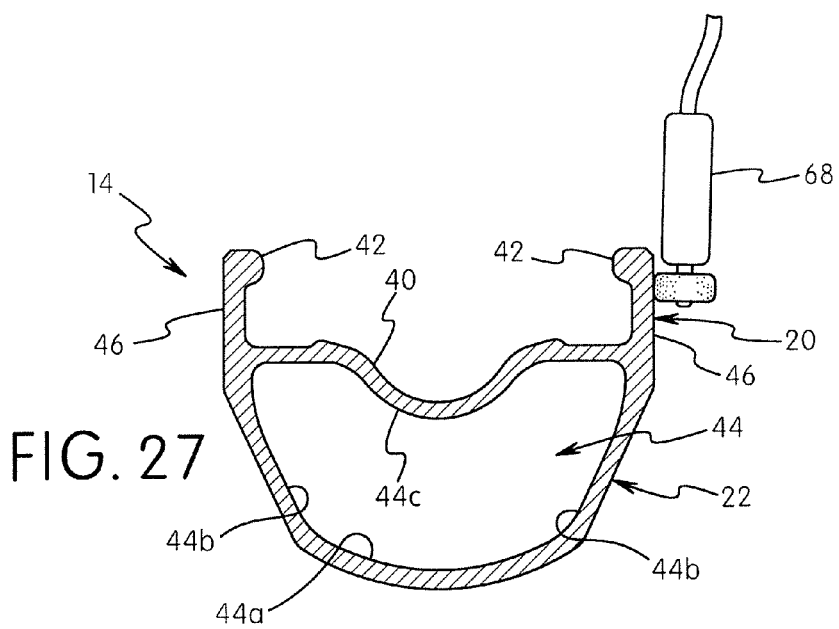
FIG. 27 is an enlarged side elevational view of a portion of the tubular rim member showing surface treating the rim to form the braking surfaces of the rim.

In step S7, as diagrammatically shown in FIGS. 26 and 27, a surface treating operation is performed on the rim 14 This surface treating operation typically includes removing any excess welding material from the rim 14 using a grinding tool 68 as seen in FIG. 26. Also the same grinding tool 68 or a different tool is then used to form the braking surfaces 46.

In steps S8 and S9, the spokes 16 are attached to the hub 12 and the rim 14. These steps S8 and S9 can be repeatedly performed one spoke at a time, or all of the spokes 16 can be first attached to the hub 12 and then the spokes 16 are attached to the rim 14.

In step S9, the spoke attachment members 26 are aligned with the spoke openings 22a so that the second or inner tubular portions 52 of the spoke attachment members 26 are disposed in the spoke openings 22a. Then the spokes 16 are individually attached to the spoke attachment members 26 of the rim 14 by the spoke plugs 28.

Finally, in step S10, the tension in the spokes 16 are adjusted using the spoke plugs 28 to the desired level of tension.

As mentioned above, the steps of manufacturing the rim 14 as seen in FIG. 17 can be accomplish in a different order, as needed and/or desired, so long as the rearranged steps do not materially prevent the rim 14 from being formed to carry out the present invention. For example, the forming of the spoke openings 22a in the rim 14 (step S4) can be performed after either step S6 or step S7.

Referring now to FIGS. 28 to 32, an enlarged cross-sectional view of a portion of a bicycle rim 114 is illustrated in accordance with another illustrated embodiment. Similar to the bicycle rim 14 discussed above, the bicycle rim 114 basically includes an annular tire mounting part 120, an annular spoke mounting part 122 with a plurality of spoke openings 122a, and a plurality of spoke attachment members 126 (only one shown). Also similar to the bicycle rim 14 discussed above, the annular tire mounting part 120 and the annular spoke mounting part 122 form an interior space 144 defined by interior surfaces 144a, 144b and 144c. The annular spoke mounting part 122 of the bicycle rim 114 includes the interior rails 144d, which are disposed on the side surfaces 114b of the annular spoke mounting part 122 and project into the interior space 144. While in this illustrated embodiment the interior rails 144d are extruded with the annular tire mounting part 120 and the annular spoke mounting part 122 as a one-piece member, it is possible to make the interior rails 144d as separate elements that are affixed to the annular spoke mounting part 122.

In the second illustrated embodiment, generally speaking, the overall shapes of the spoke attachment members 126 together with the interior configuration of the interior space 144 constitute an orientation maintaining arrangement 150. In other words, the orientation maintaining arrangement 150 is a mating configuration between the spoke attachment members 126 and the interior configuration of the interior space 144 that prevents the spoke attachment members 126 from tipping over within the interior space 144. In particular, the interior rails 144d constitute an orientation maintaining structure of the orientation maintaining arrangement 150 that limit movement of the spoke attachment members 126 within the interior space 144 with respect to a width direction of the bicycle rim 114. The interior rails 144d (e.g., the orientation maintaining structure) are lateral projections, which extend in a lateral direction with respect to the hole extending direction of the threaded bores of the spoke attachment members 126. In this way, the interior rails 144d contacts the spoke attachment members 126. While two of the interior rails 144d are used in the second illustrated embodiment, the bicycle rim 114 can be constructed with one interior rail disposed on the annular spoke mounting part 122 as needed and/or desired. The spoke attachment members 126 are slidably engaged with the interior rails to slide in the longitudinal direction of the interior space 144 with the interior rails 144d engaging the spoke attachment member 126 to maintain the orientation of the spoke attachment members 126 within the interior space 144.

Each of the spoke attachment members 126 includes a first or outer tubular portion 151, a second or inner tubular portion 152 and an orientation maintaining flange 153. The spoke attachment members 126 are preferably identical with the orientation maintaining flange 153 having a curved contact surface 153a that mates with the curvatures of the surface 144c of the annular spoke mounting part 122. The inner tubular portion 152 is dimension for being received in the spoke opening 122a. The orientation maintaining flange 153 also constitute an orientation maintaining structure of the orientation maintaining arrangement 150 that limit movement of the spoke attachment members 126 within the interior space 144 with respect to a width direction of the bicycle rim 114. Thus, the interior rails 144d and the orientation maintaining flange 153 cooperate together to limit movement of the spoke attachment members 126 within the interior space 144 with respect to a width direction of the bicycle rim 114.

The bicycle rim 114 is identical to the bicycle rim 14 discussed above, except for the annular spoke mounting part 122 being provided with the interior rails 144d and the shape of the spoke attachment members 126 being changed. Since the only differences between the rims 14 and 114 are the shapes of the spoke attachment members 126 and the addition of the interior rails 144d, the bicycle rim 114 will not be discussed in further detail herein. Rather the descriptions of the parts of the bicycle rim 14 that are similar to the parts of the bicycle rim 114 apply to the parts of the bicycle rim 114 unless otherwise stated.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the above embodiment(s), the following directional terms "circumferential", "radial", "axial", "width", "inner", "outer", and "transverse" as well as any other similar directional terms refer to those directions with respect to a center axis of rotation of the bicycle rim. The term "hoop" as used herein is not limited to a closed ring, but rather generically refers to both closed rings and split rings. Finally, terms of degree such as "substantially", "about" and "approximately" as used herein mean a reasonable amount of deviation of the modified term such that the end result is not significantly changed, e.g., manufacturing tolerances.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rim comprising:
   an annular tire mounting part;
   an annular spoke mounting part including a plurality of spoke openings disposed at predetermined locations along a circumferential direction of the annular spoke mounting part, the spoke mounting part extending from the annular tire mounting part to define an interior space with a predetermined interior shape;
   at least one spoke attachment member that is disposed in the interior space and includes a portion dimensioned to be received in one of the spoke openings; and
   an orientation maintaining structure having a predetermined configuration that is dimensioned with respect to the predetermined interior shape of the interior space to form an orientation maintaining arrangement such that the spoke attachment member is slidably disposed within the interior space in a circumferential direction of the bicycle rim to selectively align with the one of the spoke openings while also maintaining an orientation of the spoke attachment member within the interior space, the orientation of the at least one spoke attachment member being maintained while the portion of the at least one spoke attachment member is received in the one of the spoke openings.

2. The bicycle rim according to claim 1, wherein
the spoke attachment member includes the orientation maintaining structure.

3. The bicycle rim according to claim 1, wherein
the spoke attachment member and the orientation maintaining structure are one-piece.

4. The bicycle rim according to claim 1, wherein
the spoke attachment member has a spoke receiving part that includes a bore, and
the orientation maintaining structure includes a projection which extends in a lateral direction with respect to a bore extending direction of the spoke receiving part.

5. The bicycle rim according to claim 4, wherein
the projection contacts an interior surface of the annular spoke mounting part.

6. The bicycle rim according to claim 4, wherein
the projection extends along the interior surface of the annular spoke mounting part in the circumferential direction of the bicycle rim.

7. The bicycle rim according to claim 6, wherein
the projection has a curved rim contact surface with a curvature that matches a curvature of the interior surface of the annular spoke mounting part in the circumferential direction of the bicycle rim.

8. The bicycle rim according to claim 4, wherein
the orientation maintaining structure has a maximum width as measured in a direction parallel to a center axis of the bicycle rim that is larger than a minimum height of the interior space as measured in a radial direction with respect to the center axis of the bicycle rim.

9. The bicycle rim according to claim 1, wherein
the orientation maintaining structure includes at least one lateral projection that limit movement of the spoke attachment member within the interior space with respect to a width direction of the bicycle rim.

10. The bicycle rim according to claim 1, wherein
the annular tire mounting part and the annular spoke mounting part are integrally formed as a one-piece.

11. The bicycle rim according to claim 1, wherein
the annular tire mounting part is free of any openings communicating with the interior space except for a single air valve opening.

12. The bicycle rim according to claim 1, wherein
the orientation maintaining structure includes at least one interior rail disposed on the annular spoke mounting part and projecting into the interior space, and
the spoke attachment member is slidably engaged with the interior rail to slide in the longitudinal direction of the interior space while the interior rail also engages the spoke attachment member to maintain the orientation of the spoke attachment member within the interior space.

13. A bicycle rim comprising:
an annular tire mounting part;
an annular spoke mounting part including a plurality of spoke openings disposed at predetermined locations along a circumferential direction of the annular spoke mounting part, the spoke mounting part extending from the annular tire mounting part to define an interior space with a predetermined interior shape; and
at least one spoke attachment member that is disposed in the interior space, the at least one spoke attachment member including a portion dimensioned to be received in one of the spoke openings and a rim contact surface configured and arranged to contact an interior surface of the annular spoke mounting part when the portion of the at least one spoke attachment member is received in the one of the spoke openings;
the annular tire mounting part and the annular spoke mounting part being free of any openings communicating with the interior space except for a first single air valve opening provided in the annular tire mounting part and a second single air valve opening and the
spoke openings provided in the annular spoke mounting part, the spoke attachment member being dimensioned such that the spoke attachment member is larger than the spoke openings and the first and second single air valve openings and cannot pass through the spoke openings and the first and second single air valve openings.

14. A bicycle rim manufacturing method comprising:
providing a rim element including a first end, a second end and an interior space with a predetermined interior shape;
forming the rim member into a hoop;
forming a plurality of spoke openings in the rim member;
inserting at least one spoke attachment member inside the interior space of the rim member through one of the first and second ends, the spoke attachment member having a predetermined configuration that is dimensioned with respect to the predetermined interior shape of the interior space to form an orientation maintaining arrangement such that the spoke attachment member is slidably disposed within the interior space in a circumferential direction of the bicycle rim while also maintaining an orientation of the spoke attachment member within the interior space, the spoke attachment member further includes a portion dimensioned to be received in one of the spoke openings while the orientation of the spoke attachment member is maintained;
joining the first and second ends of the rim member together after the inserting of the spoke attachment member inside the interior space of the tubular rim member; and
aligning the spoke attachment element with one of the spoke openings such that the portion of the spoke attachment member is received in the one of the spoke openings.

* * * * *